Horton & Hawkins,
Piston Meter,
N° 63,388. Patented Apr. 2, 1867.
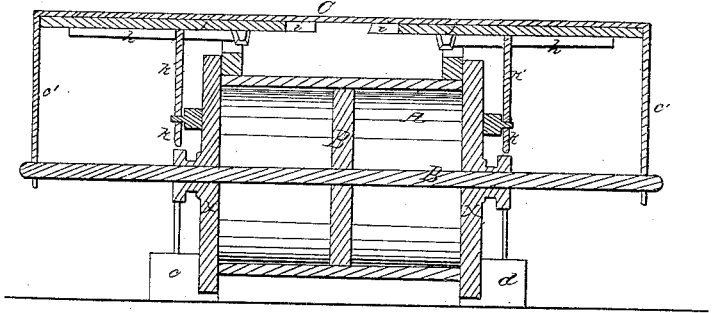
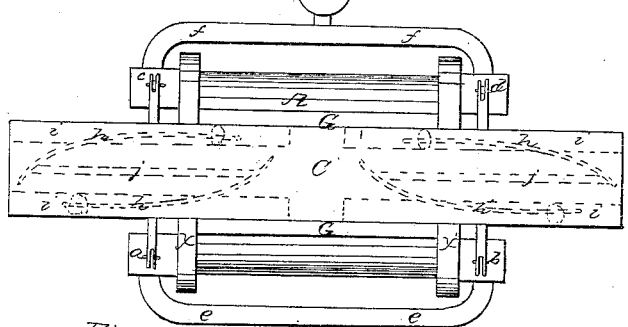
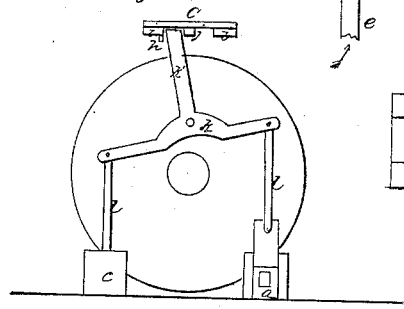
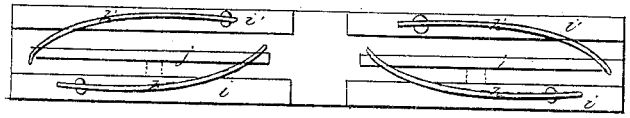
Witnesses
J. C. Clayton
Jno. L. Coombs
Inventors,
Jacob C. Horton
Samuel K. Hawkins
By J. J. Coombs.
their attorney

United States Patent Office.

JACOB C. HORTON, OF NEW YORK, AND SAMUEL K. HAWKINS, OF LANSINGBURG, NEW YORK.

*Letters Patent No. 63,388, dated April 2, 1867.*

---

IMPROVEMENT IN APPARATUS FOR MEASURING FLUIDS.

---

*The Schedule referred to in these Letters Patent and making part of the same.*

---

TO ALL WHOM IT MAY CONCERN:

Be it known that we, JACOB C. HORTON, of the city, county, and State of New York, and SAMUEL K. HAWKINS, of Lansingburg, in the county of Rensselaer, in said State of New York, have invented a new and useful Improvement in Liquid and Fluid Meters, embracing also a new method of operating valves; and we do hereby declare that the following is a full, clear, and exact description thereof, reference being had to the accompanying drawings, and to the letters of reference marked thereon.

Our invention is designed, primarily, for measuring liquor at the distillery, while in the state called beer, but is adapted to the measuring of any kind of liquid or fluid under pressure, and to the working of valves to regulate the flow or passage of either liquids or fluids. In the accompanying drawings—

Figure 1 is a vertical longitudinal section of our machine.

Figure 2 is a plan view of the same, in which the ledges and springs on the under side of plate C are shown by dotted and colored lines.

Figure 3 is an end view of the measuring cylinder and of the mechanism for operating the valves.

Figure 4 is a view of the under side of plate C.

Like letters indicate the same parts in all the figures.

A is a measuring cylinder, B is a piston sliding in the cylinder, and B' the piston-rod sliding in stuffing-boxes in the cylinder heads. C is a plate mounted on the piston-rod by arms $c'$ $c'$, and carried to and fro by the piston. $e$ is the induction pipe, $f$ the eduction pipe, and $g$ a compressed-air vessel. $a$ $b$ $c$ and $d$ are valves which operate alternately, $a$ and $b$ as induction, and $c$ and $d$ as eduction valves. $k$ is a cross-bar at each end of the cylinder, turning on a central pivot and operating the valves by means of connecting-rods, $l$ $l$, the said cross-bars, $k$, being oscillated by means of the arms $k'$, and the ledges $i$ $i'$ and $j$ $j'$ and springs $h$ $h'$ on the lower side of the plate C. $i$ and $i'$ are ledges on the outer edges and under side of the plate C, $j$ $j'$ central ledges on the under side of the same plate, and $h$ $h'$ springs, also on the under side of said plate. G and G' are guides between which plate C slides. This meter is intended to operate under a pressure of about two pounds to the square inch, more or less, which pressure may be created by a force-pump or "head."

The operation is as follows: If the piston be at the end X of the cylinder, valves $a$ and $d$ will be open, and valves $b$ and $c$ closed. If a current of liquid be now forced in through induction pipe $e$, it will enter the cylinder through valve $a$, forcing the piston to the other end of the cylinder, and forcing out the liquid on the opposite side of the piston through valve $d$ and eduction pipe $f$. As plate C moves with the piston, arm $k'$, on the end X of the cylinder, will be kept in the same position by the groove which its upper end occupies, between ledges $i$ and $j$ on the under side of plate C, while the corresponding arm at the end X' will be kept in position by occupying the groove between ledges $i'$ and $j'$ until the piston has reached the end X' of the cylinder, at which moment the arms $k'$, having respectively passed the ends of ledges $j$ and $j'$, will each be thrown by springs $h$ and $h'$ to the opposite sides of ledges $j$ and $j'$, causing the cross-bars $k$ at each end of the cylinder to rock in opposite directions, closing the valves $a$ and $d$ and opening valves $b$ and $c$ at the same instant. The liquid will now flow into the end X' of the cylinder through valve $b$, and be forced out of the opposite end through valve $c$, and as plate C travels back the valves will be kept in the same condition by the ledges $i'$ and $j$ and $i$ and $j'$ until the piston has completed its stroke, when the valves will be again reversed, as before described. Thus an automatic reciprocating motion of the piston will be kept up so long as sufficient pressure is applied, and at each movement of the piston the contents of the cylinder will be discharged in uniform quantities.

An indicator, to be operated by the reciprocating motion of the plate C, may be made to register the number of discharges of the cylinder with unerring certainty. Any mechanic of ordinary skill will be able to construct and apply such indicator and register by means of familiar mechanism, which it is deemed unnecessary to describe.

Instead of curved springs $h$ $h'$ on the lower side of plate C, rigid hinged bars may be used in combination with spiral springs, to cause said bars to press against the arms $k'$ and throw them past the ends of the centre ledges $j$ and $j'$, or springs of other forms may be used.

It is manifest that said reciprocating plate C, with its ledges and springs, as described, may be used to operate valves on pumps and steam engines, and will be found useful in all cases where it is desired to open and close valves instantaneously.

Having thus fully described our invention, and its mode of operation, what we claim, and desire to secure by Letters Patent, is—

1. In combination with the measuring cylinder, reciprocating piston, the valves $a$ $b$ $c$ $d$, and oscillating cross-bars $k$, with arms $k'$ and connecting-rods $l$, we claim the reciprocating plate C, with ledges and springs, as described, to operate the valves, all being constructed and arranged substantially in the manner set forth.

2. In combination with a measuring cylinder and reciprocating piston, as described, we claim an induction and eduction valve at each end of the cylinder, so constructed and arranged that they will be automatically opened and closed by the movement of the piston in the order herein set forth, whether by the precise mechanism herein described or by any other equivalent mechanism.

3. In combination with a measuring cylinder, with induction and eduction valves, as described, and a reciprocating piston, we claim the reciprocating plate C, with ledges and springs, substantially as described, to operate the valves by means of any suitable connecting mechanism between said plate and the valves.

4. We claim the reciprocating plate C, with ledges and springs, substantially as described, as a means of operating valves to regulate the flow or passage of any kind of liquids or fluids, whether in a meter or other machine to which the same may be applicable.

JACOB C. HORTON,
SAMUEL K. HAWKINS.

Witnesses:
S. S. Cox,
Charlton T. Lewis.